(12) United States Patent
Monros

(10) Patent No.: US 10,830,161 B2
(45) Date of Patent: Nov. 10, 2020

(54) SYSTEM AND PROCESS FOR IMPROVING EMISSION PERFORMANCE IN ENGINES

(71) Applicant: SVMTech, LLC, Costa Mesa, CA (US)

(72) Inventor: Serge V. Monros, Costa Mesa, CA (US)

(73) Assignee: SVMTech, LLC, Costa Mesa, CA (US)

( * ) Notice: Subject to any disclaimer, the term of this patent is extended or adjusted under 35 U.S.C. 154(b) by 118 days.

(21) Appl. No.: 16/032,345

(22) Filed: Jul. 11, 2018

(65) Prior Publication Data

US 2019/0017448 A1    Jan. 17, 2019

Related U.S. Application Data

(60) Provisional application No. 62/531,012, filed on Jul. 11, 2017.

(51) Int. Cl.
    *F02D 19/08*      (2006.01)
    *F02D 19/06*      (2006.01)
    (Continued)

(52) U.S. Cl.
CPC ............ *F02D 19/081* (2013.01); *F02B 43/04* (2013.01); *F02B 43/12* (2013.01); *F02D 19/0644* (2013.01); *F02D 19/0671* (2013.01); *F02D 41/0025* (2013.01); *F02D 41/0027* (2013.01); *F02D 41/064* (2013.01); *F02M 21/0206* (2013.01); *F02M 25/12* (2013.01); *F02B 2043/106* (2013.01)

(58) Field of Classification Search
CPC .... F02B 2043/106; F02B 43/04; F02B 43/12; F02D 19/0644; F02D 19/0671; F02D 19/081; F02D 41/0025; F02D 41/0027; F02D 41/064; F02M 21/0206; F02M 25/12
See application file for complete search history.

(56) References Cited

U.S. PATENT DOCUMENTS 9,051,872 B2 *   6/2015   Monros ..................... C25B 1/06
9,316,164 B2      4/2016   Monros
(Continued)

FOREIGN PATENT DOCUMENTS

JP      2016-156304 A     9/2016
JP      2016156304 A *    9/2016

OTHER PUBLICATIONS

Machine Translation of JP2016156304A PDF file: "JP2016156304A_Machine_Translation.pdf".*

(Continued)

*Primary Examiner* — Lindsay M Low
*Assistant Examiner* — Ruben Picon-Feliciano
(74) *Attorney, Agent, or Firm* — Kelly & Kelley, LLP

(57) ABSTRACT

A system for reducing polluting emissions of diesel engines includes a hydrogen gas generator that mixes the hydrogen gas with diesel fuel during certain operations phases of the engine. A default program mixes no hydrogen gas with the diesel fuel. A first operational program, during a cold start, mixes the hydrogen gas and diesel fuel in a 1:1 ratio. A second operational program, during a stabilization phase, mixes the hydrogen gas and diesel fuel in a 1:3 ratio. A third operational program, during a hot start phase, mixes the hydrogen gas and diesel fuel in a 1:2 ratio.

9 Claims, 6 Drawing Sheets

| Test | THC (g/mi) | CO (g/mi) | NOx (g/mi) | CO2 (g/mi) | NMHC (g/mi) | PM (g/mi) | L/100km | MPG |
|---|---|---|---|---|---|---|---|---|
| Baseline Cold Start | 0.156 | 0.705 | 0.510 | 279.510 | 0.045 | 0.00263 | 6.390 | 36.800 |
| System Cold Start | 0.288 | 0.488 | 0.097 | 300.850 | 0.072 | 0.00049 | 6.880 | 34.190 |
| % Diff | 84.62% | -30.78% | -80.98% | 7.63% | 60.00% | -81.52% | 7.67% | -7.09% |

| Test | THC (g/mi) | CO (g/mi) | NOx (g/mi) | CO2 (g/mi) | NMHC (g/mi) | PM (g/mi) | L/100km | MPG |
|---|---|---|---|---|---|---|---|---|
| Baseline Hot Start | 0.069 | 0.243 | 0.614 | 269.480 | 0.017 | 0.002 | 6.143 | 38.323 |
| System Hot Start | 0.083 | 0.162 | 0.564 | 280.670 | 0.025 | 0.001 | 6.393 | 37.033 |
| % Diff | 20.77% | -33.42% | -8.14% | 4.15% | 45.10% | -50.00% | 4.07% | -3.37% |

(51) Int. Cl.
   *F02B 43/12*    (2006.01)
   *F02M 25/12*    (2006.01)
   *F02M 21/02*    (2006.01)
   *F02D 41/00*    (2006.01)
   *F02D 41/06*    (2006.01)
   *F02B 43/04*    (2006.01)
   *F02B 43/10*    (2006.01)

(56) References Cited

U.S. PATENT DOCUMENTS

2010/0180838 A1   7/2010   Lewis, III et al.
2017/0335760 A1   11/2017  Haring

OTHER PUBLICATIONS

International Search Report and Written Opinion for the International Application No. PCT/US2018/056636 dated Dec. 10, 2018.

\* cited by examiner

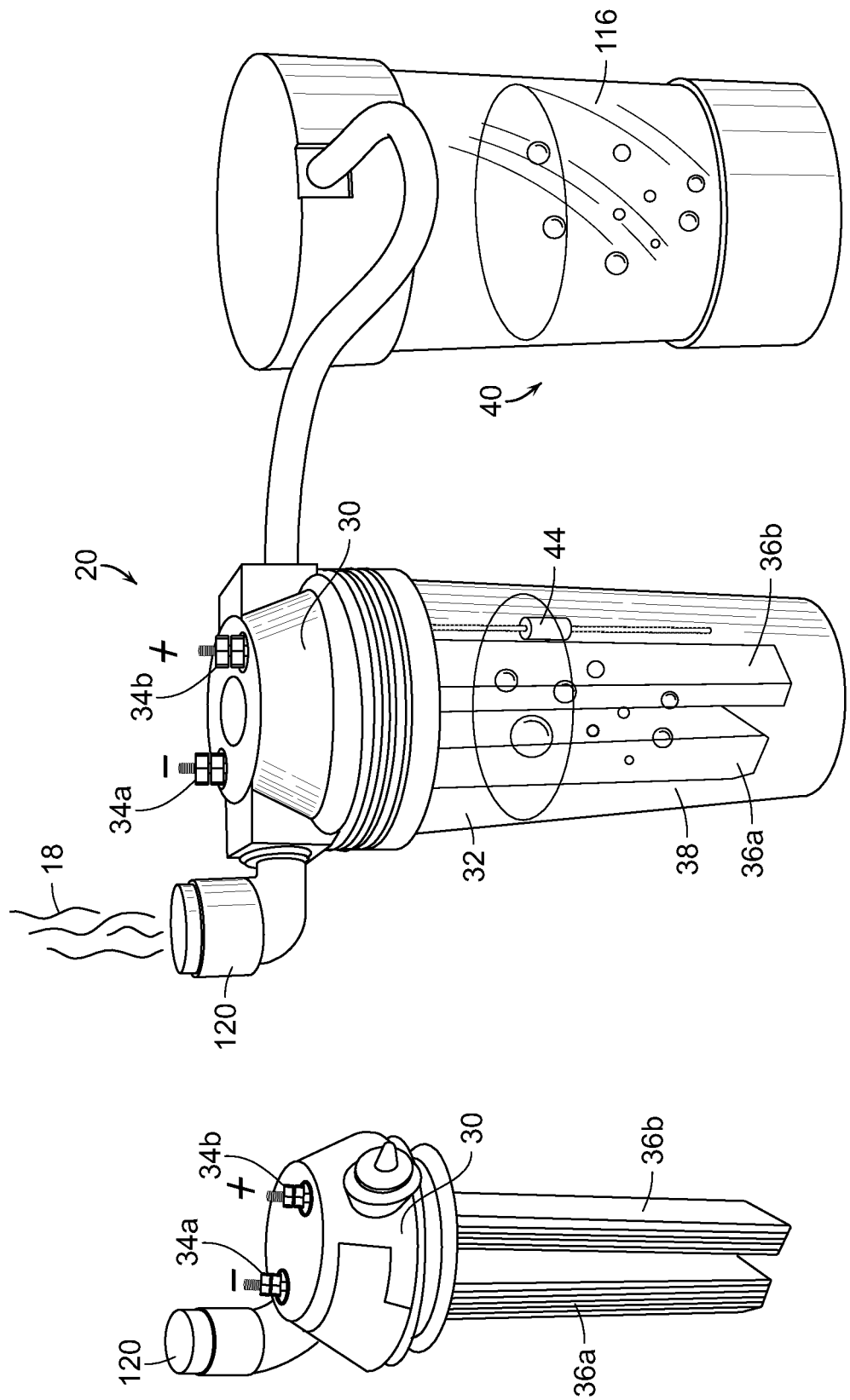

| Test | THC (g/mi) | CO (g/mi) | NOx (g/mi) | CO2 (g/mi) | NMHC (g/mi) | PM (g/mi) | L/100km | MPG |
|---|---|---|---|---|---|---|---|---|
| Baseline Cold Start | 0.156 | 0.705 | 0.510 | 279.510 | 0.045 | 0.00263 | 6.390 | 36.800 |
| System Cold Start | 0.288 | 0.488 | 0.097 | 300.850 | 0.072 | 0.00049 | 6.880 | 34.190 |
| % Diff | 84.62% | -30.78% | -80.98% | 7.63% | 60.00% | -81.52% | 7.67% | -7.09% |

FIG. 6

| Test | THC (g/mi) | CO (g/mi) | NOx (g/mi) | CO2 (g/mi) | NMHC (g/mi) | PM (g/mi) | L/100km | MPG |
|---|---|---|---|---|---|---|---|---|
| Baseline Hot Start | 0.069 | 0.243 | 0.614 | 269.480 | 0.017 | 0.002 | 6.143 | 38.323 |
| System Hot Start | 0.083 | 0.162 | 0.564 | 280.670 | 0.025 | 0.001 | 6.393 | 37.033 |
| % Diff | 20.77% | -33.42% | -8.14% | 4.15% | 45.10% | -50.00% | 4.07% | -3.37% |

FIG. 7

SYSTEM AND PROCESS FOR IMPROVING EMISSION PERFORMANCE IN ENGINES

RELATED APPLICATION

This application claims priority to U.S. Application Ser. No. 62/531,012, filed Jul. 11, 2017.

BACKGROUND OF THE INVENTION

The present invention generally relates to emission performance for diesel engines. More specifically, the present invention relates to a system and process for improving the emission profile of diesel engines, particularly during emission testing.

It is estimated that there are currently three hundred million vehicles on America's roads. Every day, the average American spends almost an hour driving in a car. Additionally, approximately seventy percent of goods that are shipped in America travel on commercial vehicles. Clearly, automobiles are an integral part of everyday life in America. The same is true for most countries around the world. The world's dependence on automobiles creates a similar dependence on fuel sources to power these automobiles. Most vehicles on the road today are fueled by gasoline or diesel fuel. Most commercial vehicles are fueled by diesel fuel.

The reliance on fossil fuels creates a host of problems. Diesel fuel prices fluctuate on a daily basis, but there is a definite upward trend in fuel pricing. There are no indicators to suggest that these fuel prices will go down in the foreseeable future. The air pollution problems inherent in the operation of gasoline fueled and diesel oil fueled internal combustion engines are well known. These air pollutants include carbon monoxide, nitrogen dioxide, particulate matter, ozone, sulfur dioxide and lead. All these pollutants are known sources of a wide variety of health problems in humans, as well as ozone depletion and acid rain in the environment. Many speculate that air pollution is causing the gradual and irreversible warming of the globe.

For this reason, many internal combustion engines use control devices, which may be required by federal and/or state regulations in order to reduce the amount of pollutants discharged in the atmosphere by internal combustion engines. These emission control devices are in response to various Air Quality Standards set by the Environmental Protection Agency (EPA), including the Clean Air Act. Individual states also have their own environmental protection regulations and methods of enforcement. California's Air Resources Board (CARB) is the strictest regulatory body concerned with pollution in the country. The emissions standards set by CARB are stricter than the federal EPA requirements, specifically with regard to hydrocarbon and nitrogen oxide emissions, which become smog. Currently, sixteen other states have adopted, or are in the process of adopting, California's strict emissions standards.

Emission control devices, however, only remove a portion of the pollutants and are subject to deterioration with the passage of time. Also, they often hinder engines from operating at peak efficiencies. Such emission control devices also are somewhat limited in their ability to remove pollutants, and increase the costs of the automobiles significantly.

For these reasons, various emission tests are employed to measure the pollutant output of most vehicles. Such emission standards include Federal testing procedures such as FTP-72 and FTP-75, among others. These Federal testing procedures involve measuring the emission profiles of internal combustion engines, including diesel engines during different phases of operation.

The FTP-72 (Federal Test Procedure) cycle is also called Urban Dynamometer Driving Schedule (UDDS) or LA-4 cycle. This cycle simulates an urban driving route and consists of two phases: (1) a cold start transient phase where the engine is at an ambient temperature of 20-30° C. for 505 seconds and (2) a stabilized phase immediately following the cold start transient phase for 867 seconds. A weighting factor of 0.43 is applied to the first phase. The second phase uses a weighting factor of 1.0. The FTP-75 cycle is derived from the FTP-72 cycle and includes a third phase—(3) a hot start transient phase at approximately the operating temperature of the engine for 505 seconds. The third phase is run after the first two phases and an intervening hot soak phase where the engine is stopped for about ten minutes (540 to 660 seconds). A weighting factor of 0.57 is applied to the first phase.

There are other variations of these tests to simulate or account for other characteristics, e.g., aggressive or high speed driving, use of air conditioning, hybrid vehicles, etc. The tests are run under driving conditions with a total duration of about 1900 seconds, about 11 miles travelled, an average speed of just over 21 miles per hour, and a maximum speed of about 56 miles per hour. The emissions from each phase are collected in separate Teflon bags and are then analyzed and expressed in g/mile or g/km.

These issues are especially problematic in diesel engines as diesel fuel is much more oily and heavier than gasoline. Thus, the emissions produced by the diesel engine contain a greater amount of pollutants, particularly during cold temperature start-up or operation.

Recently, advances have been made that make the use of alternative fuels, such as hydrogen gas, more favorable. Hydrogen gas produces less pollutants from combustion and decreases engine operating costs without complex emission control devices. Since the current transportation infrastructure does not include large numbers of widely dispersed retail suppliers of hydrogen gas for vehicles, it has been impractical to produce vehicles that are fueled primarily or solely by gaseous fuels like hydrogen gas due to range limitations. Instead, it is more practical to equip vehicles with a supply of both a liquid fuel, such as diesel fuel, and an auxiliary supply of gaseous fuel such as hydrogen gas. Such hydrogen gas can even be produced by on-board hydrogen generators.

Accordingly, there is a continuing need for a system which is capable of burning not only diesel fuel, but diesel fuel combined with hydrogen gas so as to lessen the emissions of the diesel combustion engine. What is further needed is such a system that does so with as little retrofitting as possible to the existing fuel intake systems and configuration, in order to lessen the complexity and the cost of the system and also to enable existing diesel engines to be retrofitted. The present invention fulfills these needs, and provides other related advantages.

SUMMARY OF THE INVENTION

The present invention is directed to a system for improving emission performance in internal combustion engines, particularly diesel engines. The system is designed to work with a combustion engine having a supply of fuel—particularly diesel fuel—fluidly connected to a combustion chamber. The system includes a hydrogen gas generator fluidly connected to the combustion chamber and a microcontroller coupled to the hydrogen gas generator and the supply of fuel supply. The microcontroller is configured to selectively modulate an amount of hydrogen gas and an amount of fuel entering the combustion chamber.

The microcontroller is programmed with a default operating state wherein the amount of hydrogen gas entering the combustion chamber relative to the amount of fuel is a ratio of essentially 0:1. The microcontroller is also programmed with a first operating state wherein the amount of hydrogen gas entering the combustion chamber relative to the amount of fuel is a ratio of at least 1:1. The microcontroller enters the first operating state when the engine is in a cold start phase, said cold start phase consisting of the engine being started from an ambient temperature.

The microcontroller may also be programmed with a second operating state wherein the amount of hydrogen gas entering the combustion chamber relative to the amount of fuel is a ratio of at least 1:3, wherein the microcontroller enters the second operating state when the engine is in a stabilized phase. The microcontroller may also be programmed with a third operating state wherein the amount of hydrogen gas entering the combustion chamber relative to the amount of fuel in a ratio of at least 1:2. The microcontroller enters the third operating state when the engine is in a hot start phase.

The hydrogen gas generator preferably is an electrolysis device containing an electrolyte solution. The electrolyte solution may include a solution of an electrolytic salt, e.g., sodium hydroxide, potassium nitrate, sodium bicarbonate (baking soda) or the like, or a solution of lemon crystals.

A process for improving emission performance in internal combustion engines, wherein a supply of fuel is fluidly connected to a combustion chamber in the engine. The process includes providing a hydrogen gas generator also fluidly connected to the combustion chamber in the engine. A microcontroller is provided and electrically connected to the hydrogen gas generator and the supply of fuel. The microcontroller is configured to modulate an amount of hydrogen gas and an amount of fuel entering the combustion chamber;

The microcontroller is preferably programmed with a default operating state wherein the amount of hydrogen gas entering the combustion chamber relative to the amount of fuel is in a ratio of essentially 0:1. The microcontroller is also preferably programmed with a first operating state wherein the amount of hydrogen gas entering the combustion chamber relative to the amount of fuel is in a ratio of at least 1:1. The first operating state in the microcontroller is started when a cold start operational phase of the engine begins. The first operating state in the microcontroller is stopped when the cold start operational phase of the engine ends.

The microcontroller may also be programmed with a second operating state wherein the amount of hydrogen gas entering the combustion chamber relative to the amount of fuel is in a ratio of at least 1:3. The second operating state in the microcontroller is started when a stabilized operational phase of the engine begins. The second operating state in the microcontroller is stopped when the stabilized operational phase of the engine ends.

The microcontroller may also be programmed with a third operating state wherein the amount of hydrogen gas entering the combustion chamber relative to the amount of fuel is in a ratio of at least 1:2. The third operating state in the microcontroller is started when a hot start operational phase of the engine begins. The third operating state in the microcontroller is stopped when the hot start operational phase of the engine ends.

Either above described system or process may function in combination with either a diesel or gasoline engine, or any other type of fuel commonly used in an internal combustion engine. The main trust of the inventive system and method is that the amount of polluting combustible fuel is reduced by an amount of clean-burning, on-demand hydrogen gas according to a current operating state of the engine based upon various engine sensor parameters.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 4 is a perspective view of a cap and electrode plates of an embodiment of a hydrogen gas generator for use with the present invention;

FIG. 5 is a perspective view of an embodiment of a hydrogen gas generator coupled to an optional bubbler reservoir for use with the present invention;

FIG. 6 is a chart comparing emission and performance results for a diesel engine in a cold start with and without the inventive system;

FIG. 7 is a chart comparing emission and performance results for a diesel engine in a hot start with and without the inventive system.

DETAILED DESCRIPTION OF THE PREFERRED EMBODIMENTS

As shown in the accompanying drawings, for purposes of illustration, the present invention resides in a system for improving emission performance of internal combustion engines, particularly diesel engines. The following detailed description will focus on diesel engines, but the system and process are capable of implementation in gasoline or other fuel engines.

Figure 1:
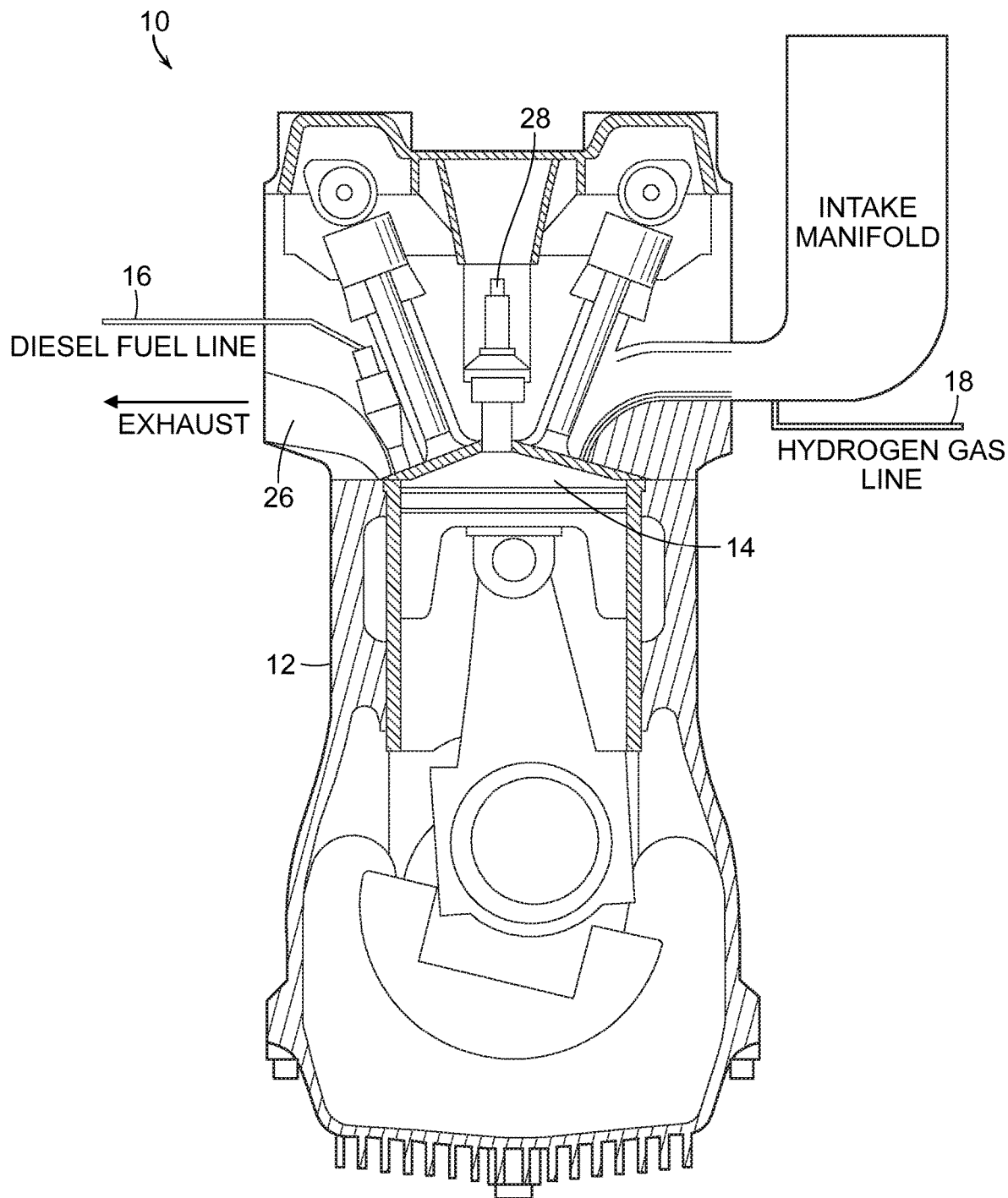
FIG. 1 is a schematic illustration of an engine incorporating the system for improving emission performance in diesel engines of the present invention.
Figure 2:
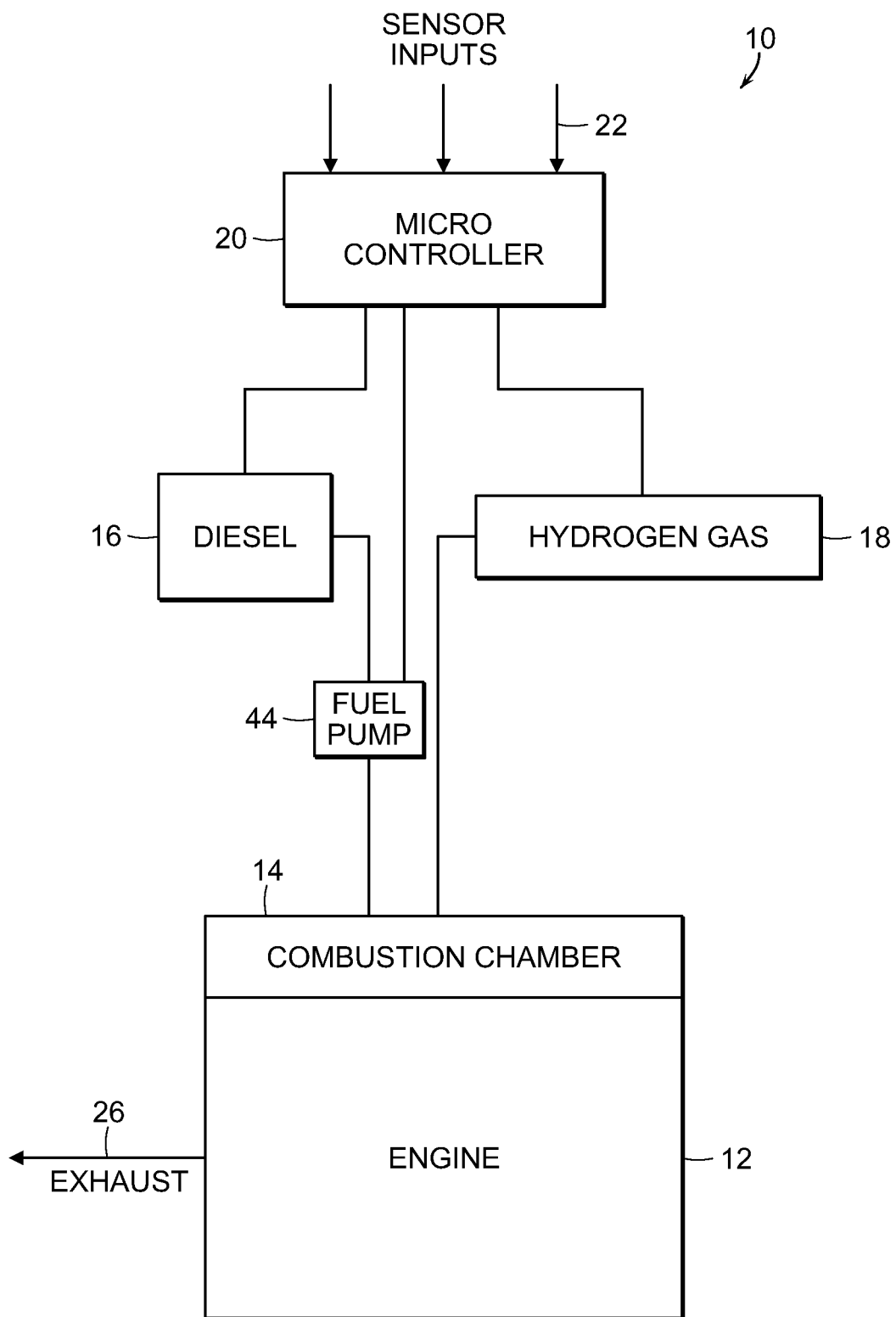
FIG. 2 is a schematic illustration of the system for improving emission performance in diesel engines of the present invention.
Figure 3:
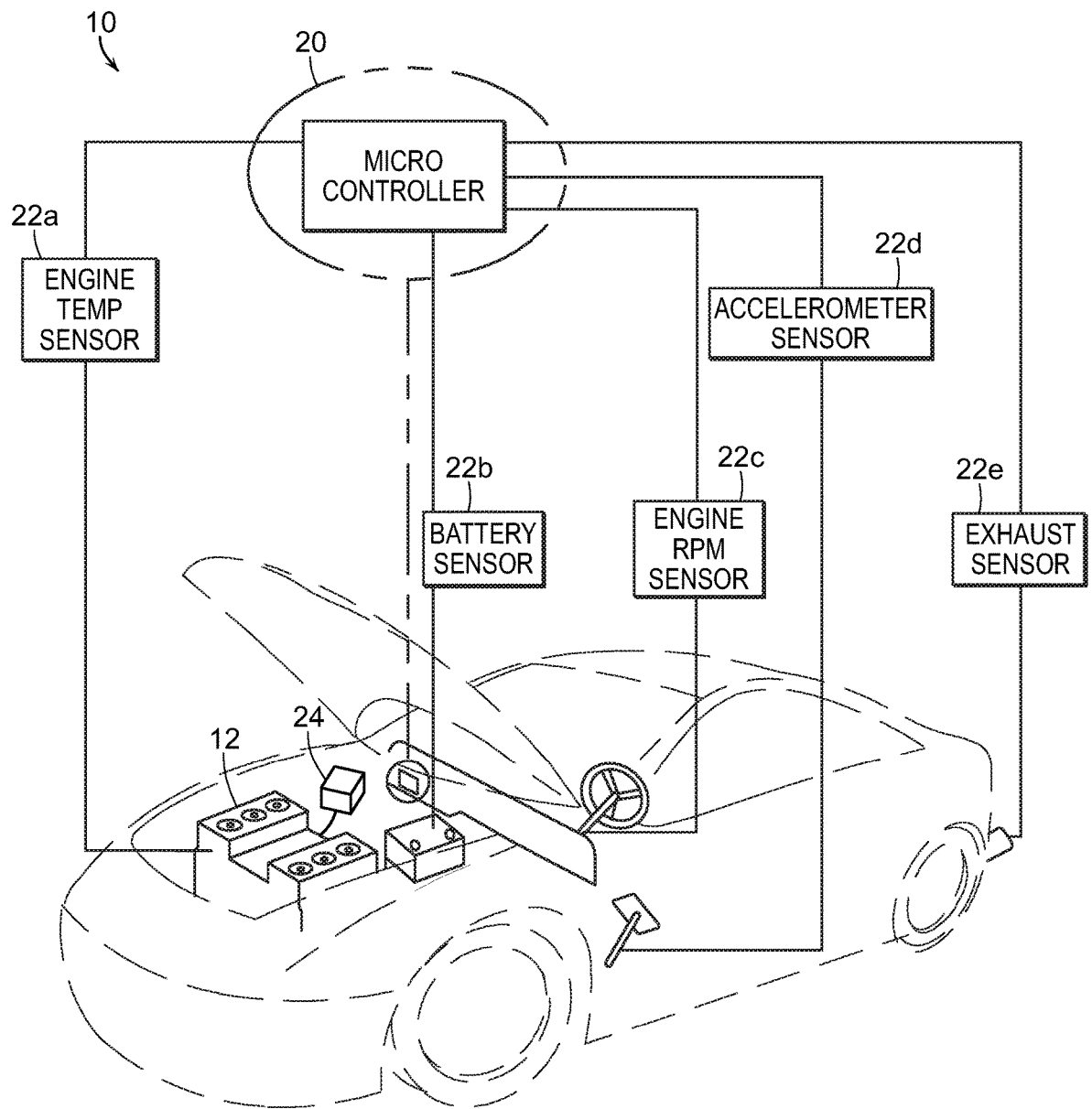
FIG. 3 is a schematic illustration of the system for improving emission performance in diesel engines of the present invention showing numerous engine sensors operationally connected to the microcontroller.

The system, generally referred to by reference numeral 10 in the attached FIGS. 1-3, is essentially a on-demand, hydrogen assist system for a diesel engine. The system 10 is designed to work with an internal combustion engine 12, preferably a diesel engine 12. The engine 12 includes a combustion chamber 14 and a supply of diesel fuel 16 fluidly connected thereto. This basic structure of the diesel engine 12 is intended to be configured as is typically found in existing diesel engines 12.

The inventive system 10 is designed primarily as an aftermarket or retrofit system to be added on to engines 12 as needed. However, the inventive system 10 can also be designed and installed as an OEM system or otherwise installed by a manufacturer or dealer.

The inventive system 10 includes a hydrogen gas generator 18 that is fluidly connected to the combustion chamber 14. A microcontroller 20 is also included and coupled to both the supply of hydrogen gas 18 and the supply of diesel fuel 16. The microcontroller 20 is configured to selectively modulate both the amount of hydrogen gas and the amount of diesel fuel entering the combustion chamber 14. The microcontroller 20 is fully programmable and provides for the selective injection of hydrogen in the combustion chamber.

The system 10 may also include a plurality of sensors 22, including an engine temperature sensor 22a, a battery sensor 22b, an rpm sensor 22c, an accelerometer 22d, and an exhaust sensor 22e. The sensors 22 are used to monitor the engine 12 and determine an operating phase thereof. The operating phase of the engine 12 is useful in the inventive method as described more fully below. The hydrogen gas 18 is preferably supplied from a hydrogen gas generator 24 or similar source that provides hydrogen gas on demand. Such operation minimizes hazards associated with storage of hydrogen gas in a tank. As shown in FIG. 1, the engine 12 may also include an exhaust outlet 26 and an ignition plug 28 designed to ignite the hydrogen gas 18.

The microcontroller 20 is preferably programmed with several operating states. A default operating state for the microcontroller 20 modulates the amount of hydrogen gas entering the combustion chamber 14 to effectively zero. The ratio of the amount of hydrogen gas relative to the amount of diesel fuel entering the combustion chamber 14 is essentially 0:1 in this default operating state. The default operating state is intended to allow normal operation of the diesel engine 12 as if the system 10 had never been installed.

Different operating states are intended to increase the amount of hydrogen gas 18 relative to diesel fuel 16 and other compounds that is introduced into the combustion chamber 14. It is desirable to use mostly hydrogen gas 18 during a cold engine start so as to minimize the amount of pollutants produced by the cold combustion of diesel fuel. As the engine temperature increases, the amount of hydrogen gas 18 can be reduced and the amount of diesel fuel 16 can be increased. The hydrogen gas 18 preferably has a 140 octane rating and is clean burning. The diesel fuel 16 may be vaporized or ionized to assist in the clean combustion of the same.

The microcontroller 20 is preferably programmed with a first operating state. The first operating state for the microcontroller 20 modulates the amount of hydrogen gas entering the combustion chamber 14 to effectively the same amount of diesel fuel entering the combustion chamber 14. The ratio of the amount of hydrogen gas relative to the amount of diesel fuel entering the combustion chamber 12 is essentially 1:1 in this first operating state. The first operating state is intended to be used during an operating phase of the engine 12 when it produces the greatest quantity of pollutants. This has been determined to be when the engine 12 is first started from an ambient temperature, e.g., a cold start phase.

Providing diesel fuel and hydrogen gas in essentially equal amounts in the cold start phase has been found to reduce levels of polluting exhaust gases while only slightly reducing performance, as shown in FIG. 6. The tests report on pollutants in grams per mile for total hydrocarbons (THC), carbon monoxide (CO), nitrogen oxides (NOx), carbon dioxide (CO2), non-methane hydrocarbons (NHMC), and diesel particular matter (PM). This same test also measured engine performance in the form of liters per 100 kilometers (L/100 km) and miles per gallon (MPG). These results show significant reductions in CO, NOx, and PM with only a minor decrease in MPG.

The microcontroller 20 is also preferably programmed with a second operating state. The second operating state for the microcontroller 20 modulates the amount of hydrogen gas entering the combustion chamber 14 to effectively about one-third of the amount of diesel fuel entering the combustion chamber 14. The ratio of the amount of hydrogen gas relative to the amount of diesel fuel entering the combustion chamber 12 is essentially 1:3 in this second operating state. The second operating state is intended to be used during an operating phase of the engine 12 after it has warmed up and is continuously running, when it produces a slightly lesser quantity of pollutants. This has been determined to be when the engine 12 has warmed up to its designed operating temperature after about five to ten minutes, e.g., a stabilized phase. Providing hydrogen gas and diesel fuel in essentially a 1:3 ratio has been found to reduce levels of polluting exhaust gases while again only slightly reducing performance.

The microcontroller 20 is also preferably programmed with a third operating state. The third operating state for the microcontroller 20 modulates the amount of hydrogen gas entering the combustion chamber 14 to effectively the about one-half of the amount of diesel fuel entering the combustion chamber 14. The ratio of the amount of hydrogen gas relative to the amount of diesel fuel entering the combustion chamber 12 is essentially 1:2 in this third operating state. The third operating state is intended to be used during an operating phase of the engine 12 when it is started from approximately an operating temperature. This state is achieved then the engine 12 has been run to the operating temperature, shut-off and allowed to rest or "soak" in ambient air for about ten minutes, and then started again, e.g., a hot start phase.

Providing hydrogen gas and diesel fuel in essentially a 1:2 ratio has been found to reduce levels of polluting exhaust gases while only slightly reducing performance, as shown in FIG. 7. These results show significant reductions in CO, NOx, and PM with only a minor decrease in MPG.

In conjunction with the FTP-72 or FTP-75 tests (or similar multi-phase analyses), it has been found that the use of the inventive system during at least the cold start phase (or similar phase) reduces the amount of pollutants sufficiently to impact the overall test results. The reduction of pollutants achieved during the cold start phase is sufficient to reduce the average overall pollutants for the entire test so as to achieve a passing result. The cold start phase is when an engine, particularly a diesel engine, produces the greatest quantity of pollutants. By reducing the production of pollutants during the cold start phase, one can eliminate sufficient pollutants to meet Federal and other testing standards for the overall test. Alternative, the system 10 can be used during all phases of such emission tests so as to provide an overall reduction of pollutants in the emissions from a diesel engine 12.

The hydrogen gas generator 24 may produce hydrogen gas in a number of ways, but is preferably a compact unit that is installed in engine compartment. In one preferred embodiment, the hydrogen gas generator 24 includes a condenser that is intended to prevent or minimize evaporation of a catalyst. In this form, the catalyst is preferably a non-toxic lemon crystal-type catalyst. Such a catalyst requires increased amperage to vaporize the catalyst because the lemon crystal is not as strong a catalyst as sodium hydroxide or similar compounds. The benefit to the lemon crystal catalyst is that it is non-toxic.

FIGS. 4-5 illustrate a form of a hydrogen gas generator 24 which uses electrolysis to generate hydrogen gas. The hydrogen gas generator 24 includes a cap 30 which seals the top of a container 32. The container 32 is preferably no larger than a windshield wiper bottle or similar reservoir found in an engine compartment. Electrodes or terminals 34a and 34b, representing the cathode and anode, extend from electrical coupling to the plates 36a and 36b to the exterior of the cap 30 so as to be coupled to electrical wires from an electrical source, e.g., a battery or alternator, of the engine 12.

The hydrogen generator is preferably supplied with a liquid designed to generate sufficient hydrogen from electrolysis. Pure water is not a very effective electrolysis liquid and it would require a large amount of electricity to be applied to the electrodes 34a, 34b in order to electrolyze the water into hydrogen gas. Thus, preferably, an electrolyte water 38 solution is created, such as by adding an electrolytic salt—sodium hydroxide, potassium nitrate, sodium bicarbonate (baking soda) or the like—to the water. This creates an effective electrolyte solution 38 which requires much less electricity to cause the electrolysis of the water. As the plates 36a, 36b become electrically charged, they cause the electrolyte solution 38 to "boil" or bubble, creating hydrogen gas 18 in an upper portion of the generator 20. This hydrogen gas 18 is channeled via outlet 40 to the intake manifold as shown in FIG. 1. Hydrogen gas 18 produced in such a manner is approximately 180 octane, and thus provides a very efficient fuel source for mixing with diesel fuel to reduce the polluting emissions, The hydrogen generator 24 is coupled with a warning light, preferably on the dashboard or elsewhere within the driver compartment, to provide notice when the water level or catalyst in the generator 24 is low. The microcontroller 20 can also be programmed to shut off the system 10 or hydrogen generator 24 so neither is damaged by operating without sufficient water or catalyst. If there is insufficient water, the hydrogen generator 24 can burn out because. If the generator 24 is not producing hydrogen 18, the engine 12 can misfire, produce excessive pollutants, or otherwise not operate as intended is the microcontroller 24 is expecting to supply a certain amount of hydrogen 18 to the combustion chamber 14. Thus, there is a sensor for monitoring when the generator 24 is running out of water.

If the mixture of water and catalyst is within certain tolerances, there is desired potency where the generator will be more efficient in producing hydrogen gas 18. If the mixture of water and catalyst goes below a minimum tolerance, then the generator 24 will not produce enough hydrogen 18. If the mixture of water and catalyst exceeds a maximum tolerance then the generator 24 could burn out a lot sooner. So this is a sensor that provides notice when the generator 24 is out of the minimum-maximum tolerances, at which time a user can either increase the amount of catalyst or increase the amount of water to make the mixture the desired potency.

As illustrated in FIG. 5, one may incorporate a reservoir bubbler 42 having additional electrolyte solution 38 therein so as to refill and recharge the hydrogen gas generator 20 as the electrolyte solution levels decrease over time. However, the reservoir bubbler 42 does take up valuable space within the engine compartment. Thus, it is contemplated that the generator 20 includes a sensor 44 which will alert the user when the electrolyte solution 38 level gets low. It is anticipated with normal use, the electrolyte water solution will only need to be filled every few months.

In a particularly preferred embodiment, the electrolyte liquid 38 is a solution of lemon crystal catalyst. To create this lemon crystal electrolyte liquid 38, one mixes about 1 tablespoon of lemon crystals with 8 ounces of water and allows the lemon crystals to dissolve for about 8 hours, agitating the mixture with about 50 oscillations every 1½ to 2 hours. Such a prepared lemon crystal electrolyte solution 38 will effectively remain in solution until used. The lemon crystal electrolyte liquid 38 may also be mixed with an alcohol to guard against freezing temperatures.

Figure 8:
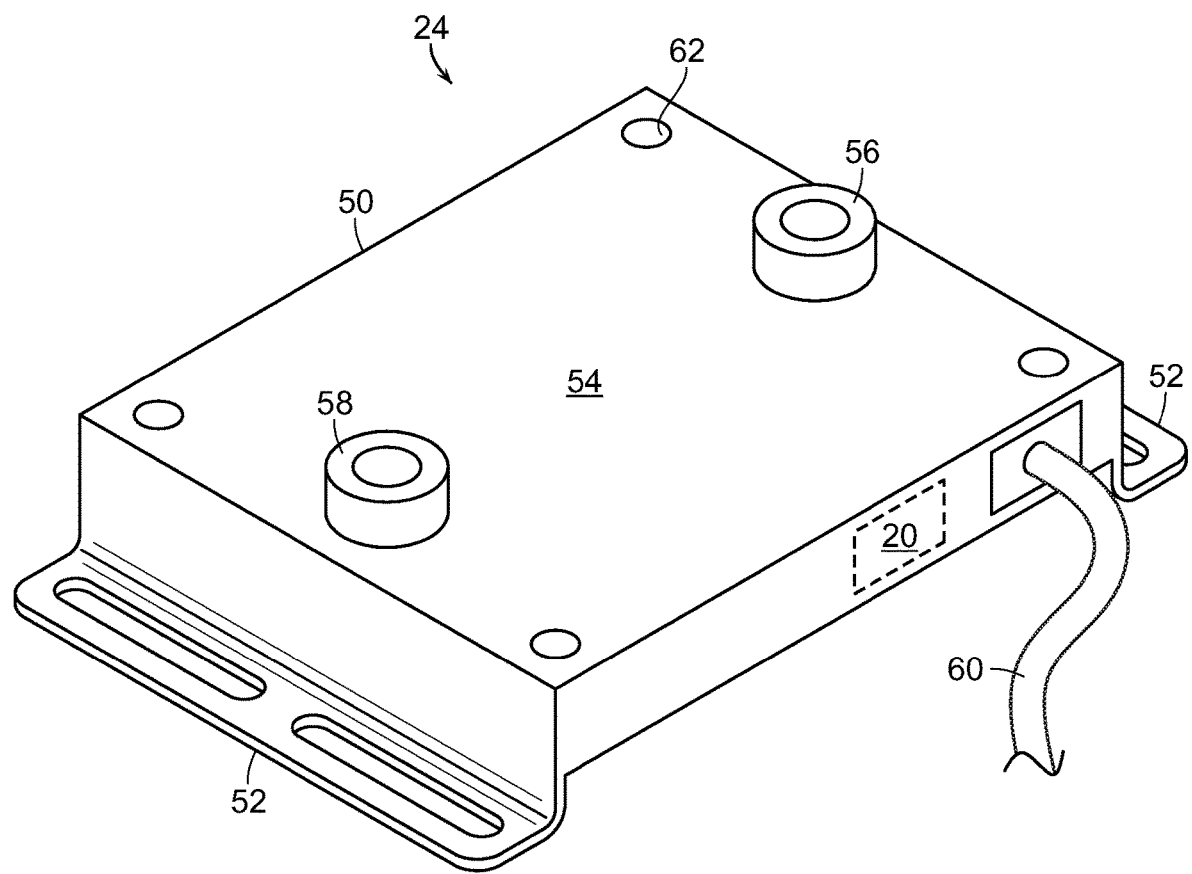
FIG. 8 is a perspective view of an alternate embodiment of a sealed hydrogen gas generator of the present invention.

FIG. 8 illustrates an alternate embodiment of the hydrogen gas generator 24 of the present invention. In this embodiment, the generator 24 is a sealed, tamper-proof device 50 having mounting brackets 52, a sealed cover, 54, a catalyst refill port 56, and a hydrogen gas outlet port 58. The device 50 also has a control wire 60 that connects to the engine battery and sensors as described above. The device 50 may be self-contained such that it includes an internal, pre-programmed microcontroller 20. The sealed cover 54 may be mounted attached using permanent or removable bolts 62. Preferably, the removable bolts 62 are removable only be a specialized tool to minimize the chance that a consumer might alter or damages the device 50. As with the prior embodiment of the generator 24, this device 50 may contain lemon crystals or a similar catalyst to generate the hydrogen gas 18.

The generators 24 are preferably sealed to prevent inadvertent maladjustment of the same. Operators can be trained to properly install, adjust, and maintain generators 24 or fleets of vehicles with generators when performing routine maintenance. The use of hydrogen 18 mixed with fuel 16 provides huge reductions in the particulate matter and NOx, particularly in diesel engines, and also provide much better fuel efficiency.

The microcontrollers 24 can be programmed to improve fuel economy regardless of whether the on-demand, hydrogen-assist system 10 is being used. The microcontroller 24 is connected directly to the vehicle's fuel pump 44 and ECU and they are fully programmable to set desired fuel efficiencies and be locked against tampering. The microcontroller 24 is connected to most engine sensors 22, which would be mostly oxygen sensors. When connected directly to the fuel pump 44, the microcontroller 24 can fine tune the operation of the engine to respond to sensor signals and emissions to improve fuel efficiency, even without hydrogen-assist. Such direct fine tuning of the fuel pump can result in up to 15% improvement in fuel efficiency. When using the on-demand, hydrogen-assist system 10, the oxygen sensors can actually be removed because hydrogen is such a clean burning fuel. Hydrogen is a zero emissions fuel with the only by-product being water.

The inventive system 10 has particular application in over-polluting engines 12, especially in third-world countries where the operators of vehicles such as trucks (18-wheelers) are being killed because the emissions and soot everywhere. The inventive system 10 is able to bring those diesel engines pretty much into line with equivalent gasoline engines. In order to achieve this outcome, the system 10 can be installed in one of two ways. In one way, most of the engine sensors, such as the air-mass, air flow and the oxygen sensors, are connected to the microcontroller 24, but this is a much longer installation. The second method involves just removing the air-mass, air flow, and oxygen sensors and then connecting the microcontroller 24 directly into the ECU on the vehicle—it doesn't matter whether the ECU uses OBD-1 or OBD-2 diagnostics. The system 10 is able to be programmed without even adding hydrogen. On average, the inventive system 10 can improve fuel economy by about 10-15% just by hooking up the microcontroller 24 to any vehicle without adding any additional fuel. The microcontroller 24 controls the pump for the fuel 16 so the system 10 is in full control of the fuel pump and is able to get any parameters from the ECU.

The hydrogen generator 24 can be a single generator or multiple generators 24 installed in series or parallel depending upon the level of demand for hydrogen, i.e., size of the engine. When using multiple generators 24, each acts as a back-up for the others. The multiple generators 24 can be aligned so that the hydrogen lines and electrical supply all plug into each other so the system 10 can make any size hydrogen generator 24 desired so as to multiply the amount of hydrogen. The multiple generators 24 are completely programmable as a single generator or as multiple generators in parallel. If one generator fails, it is very simple to replace one of multiple generators rather than a single big generator, i.e., a 50 liter hydrogen generator. In addition, multiple generators minimize the wear and demand on a single generator, providing for a longer lifetime of use. The key factor is being able to bring hydrogen on-demand so there is no reservoir storing a large volume of hydrogen gas on the vehicle to minimize the risk of explosion.

The system 10 is scalable with any type of engine, whether a small system for motorcycle engine or a large system for big ships, to generate as much hydrogen as needed. The programmable nature of the system 10 allows for fine tuning on a particular engine to find a "sweet spot" where emissions or minimized and power is maximized. For large vehicles, i.e., 18-wheeler trucks, the operators would realize a big reduction in the amount of fuel purchased because they will be using only water to supplement whatever fuel that they are saving. The generators function for a long duration on a little amount of water and catalyst, especially with multiple generators, by doubling the efficiency with two generators, or tripling the efficiency with three generators, etc.

In operation, particularly in emissions testing, the on-demand, hydrogen assist system 10 is installed on the engine 12 prior to conducting any emissions testing. When the engine 12 is in a cold start state, the microcontroller 20 causes the system 10 to inject hydrogen 18 along with the fuel 16 into the combustion chamber 14. As the microcontroller 20 is fully adjustable, when the testing is performed during installation or under laboratory conditions, the emissions profile can be observed in real time and the effect of the system 10 can be observed as the engine 12 warms up from the cold start. The engine 12 can then be tested on a dynamometer and the microcontroller 20 can be pre-program according to the specific size of the engine 12.

Whether the engine 12 is a Volkswagen diesel engine with 2.0 TDI or a big 60 to 30 MM diesel truck, the concept is the same. A diesel engine 12 generates a lot of power, but also produces extreme amounts of pollution, particularly in a cold start state. They also produce particulate matter that is way above environmental tolerances.

To counter the pollution and particulates, the system 10 injects an amount of hydrogen 18 into the combustion chamber 14. The hydrogen 18 can be introduced through the fuel injectors, mixed with the air intake through the air filter, it could actually go between the air filter and the throttle body. In an engine 12 with a turbo charger, the hydrogen 18 can go in when the fuel is energized.

In the sensors 22, one would be temperature sensor 22a such that when the engine 12 is at a running or warm idle temperature, the system 10 would lessen the amount of hydrogen 18, preferably back to the default state to operate fully on diesel 16. Since the microcontroller 20 is fully programmable, the system 10, could still introduce a percentage of hydrogen 18 that can vary depending on the emission. Again, this is something that can be observed and programmed during installation or under laboratory conditions. The microcontroller 20 can be programmed to maintain the NOx or other pollutants below a maximum level or within a window. The same thing can be done for particulate matter. In diesel engines, particulate matter and NOx are the two greatest pollutants. The inventive system 10 was able to lower both particulate and NOx by 81-82% by adding at least 30% hydrogen until the engine reached an idle/operation temperature and then the microcontroller 20 would lessen the amount of hydrogen 18 and permit the engine 12 to run on almost pure fuel 16.

Operating such engines 12 on hydrogen 18 is safe as long as the engine 12 is not operated on pure hydrogen 18. Eventually, a gasoline or diesel engine 12 running on pure hydrogen would experience deterioration of the seals and gaskets. There are certain modifications that can be made to retrofit a gasoline engine to be fully operational on hydrogen based on the way the engine 12 is made and because of the parameters with which the microcontroller 20 is programmed. Eventually, such engines would be able to lean out diesel or gasoline for longer durations and, if the engines are retrofitted to be plated so they can take the extra heat and the gaskets replaced to withstand the hydrogen combustion, or apply a special coatings on critical areas of the engine, it could be run on 100% hydrogen.

Although several embodiments have been described in detail for purposes of illustration, various modifications may be made without departing from the scope and spirit of the invention.

What is claimed is:

1. A process for improving emission performance in an engine, wherein a supply of fuel is fluidly connected to a combustion chamber in the engine, comprising the steps of:

providing a hydrogen gas generator fluidly connected to the combustion chamber in the engine;

providing a microcontroller electrically connected to the hydrogen gas generator and a pump on the supply of fuel, wherein the microcontroller is configured to modulate an amount of hydrogen gas and an amount of fuel entering the combustion chamber;

programming the microcontroller with a default operating state wherein the amount of hydrogen gas entering the combustion chamber relative to the amount of fuel is in a ratio of essentially 0:1;

programming the microcontroller with a first operating state wherein the amount of hydrogen gas entering the combustion chamber relative to the amount of fuel is in a ratio of at least 1:1;

starting the first operating state in the microcontroller when a cold start operational phase of the engine begins;

stopping the first operating state in the microcontroller when the cold start operational phase of the engine ends;

programming the microcontroller with a second operating state wherein the amount of hydrogen gas entering the combustion chamber relative to the amount of fuel is in a ratio of at least 1:3;

starting the second operating state in the microcontroller when a stabilized operational phase of the engine begins; and stopping the second operating state in the microcontroller when the stabilized operational phase of the engine ends.

2. The process of claim 1, further comprising the steps of:

programming the microcontroller with a third operating state wherein the amount of hydrogen gas entering the combustion chamber relative to the amount of fuel is in a ratio of at least 1:2;

starting the third operating state in the microcontroller when a hot start operational phase of the engine begins;

stopping the third operating state in the microcontroller when the hot start operational phase of the engine ends.

3. The process of claim 1, wherein the hydrogen gas generator comprises an electrolysis device containing an electrolyte solution.

4. The process of claim 3, wherein the electrolyte solution comprises a solution of an electrolytic salt or a solution of lemon crystals.

5. The process of claim 1, wherein the engine is either a gasoline engine or a diesel engine, and the supply of fuel is either gasoline fuel or diesel fuel.

6. A process for improving emission performance in a diesel engine, wherein a supply of diesel fuel is fluidly connected to a combustion chamber in the diesel engine, comprising the steps of:

providing a hydrogen gas generator fluidly connected to the combustion chamber in the diesel engine;

providing a microcontroller electrically connected to the hydrogen gas generator and a pump on the supply of diesel fuel, wherein the microcontroller is configured to modulate an amount of hydrogen gas and an amount of diesel fuel entering the combustion chamber;

programming the microcontroller with a default operating state wherein the amount of hydrogen gas entering the combustion chamber relative to the amount of diesel fuel is in a ratio of essentially 0:1;

programming the microcontroller with a first operating state wherein the amount of hydrogen gas entering the combustion chamber relative to the amount of diesel fuel is in a ratio of at least 1:1;

starting the first operating state in the microcontroller when a cold start operational phase of the diesel engine begins;

stopping the first operating state in the microcontroller when the cold start operational phase of the diesel engine ends;

programming the microcontroller with a second operating state wherein the amount of hydrogen gas entering the combustion chamber relative to the amount of diesel fuel is in a ratio of at least 1:3;

starting the second operating state in the microcontroller when a stabilized operational phase of the diesel engine begins; and stopping the second operating state in the microcontroller when the stabilized operational phase of the diesel engine ends.

7. The process of claim 6, further comprising the steps of:

programming the microcontroller with a third operating state wherein the amount of hydrogen gas entering the combustion chamber relative to the amount of diesel fuel is in a ratio of at least 1:2;

starting the third operating state in the microcontroller when a hot start operational phase of the diesel engine begins;

stopping the third operating state in the microcontroller when the hot start operational phase of the diesel engine ends.

8. The process of claim 6, wherein the hydrogen gas generator comprises an electrolysis device containing an electrolyte solution.

9. The process of claim 8, wherein the electrolyte solution comprises a solution of an electrolytic salt or a solution of lemon crystals.

* * * * *